United States Patent Office 3,250,776
Patented May 10, 1966

3,250,776
HALOALKYL SPIRO BARBITURATES
William S. Friedlander, Hudson, Wis., and John R. Mattson, Maplewood, Minn., assignors to Minnesota Mining and Manufacturing Company, St. Paul, Minn., a corporation of Delaware
No Drawing.  Filed Apr. 5, 1963, Ser. No. 270,813
6 Claims.  (Cl. 260—257)

This application is a continuation-in-part of copending applications Serial Number 73,479, filed December 5, 1960 and Serial Number 144,560, filed October 12, 1961 which latter is a continuation-in-part of application Serial Number 73,476, filed December 5, 1960, all now abandoned.

This invention relates to certain new and useful spiro[3'-($\alpha,\alpha$-dihydroperhaloalkyl)-5'-halo - cyclohexane-1',5-(barbiturates)] and methods for making the same.

These new spirobarbiturates are represented generically by the formula:

(1)

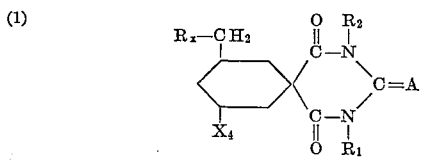

wherein:

$R_1$ and $R_2$ are individually selected from the group consisting of hydrogen, lower alkyl, and lower alkenyl, $R_x$ is a perhaloalkyl radical selected from the group consisting of perfluoroalkyl having from 1 to 12 carbon atoms, trichloromethyl, tribromomethyl, chlorodifluoromethyl, bromodifluoromethyl, iododifluoromethyl, fluorodichloromethyl, fluorodibromomethyl, chlorodibromomethyl, bromodichloromethyl, iododichloromethyl, chlorodiiodomethyl and chlorobromoiodomethyl, $X_4$ is a halogen of the group consisting of chlorine, bromine and iodine selected to have an atomic number at least as great as the atomic number of the halogen of $R_x$ with thte highest atomic number, and A is selected from the group consisting of oxygen and sulfur.

Compounds of Formula 1 form useful salts when $R_1$ is hydrogen. A generic formula for these salts can be written as follows:

(2)

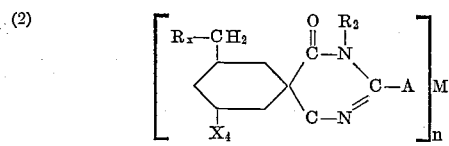

where M is a physiologically acceptable cation selected from the group consisting of alkali metals, ammonium, and organic ammonium radicals; $R_2$, $R_x$, $X_4$ and A have their above defined meanings, and $n$ is 1 or 2 and is equal to the valence of M in any given compound.

The invention thus includes the useful class of compounds consisting of spirobarbiturates of Formula 1 and the physiologically acceptable salts thereof with base.

One group of compounds of the invention is that wherein $R_1$ and $R_2$ are both hydrogen, A is oxygen, $R_x$ is a perfluoroalkyl radical containing 1 to 12 carbon atoms, and $X_4$ is chlorine or bromine.

These compounds of the invention are readily prepared by reacting the appropriate diallylbarbituric acid with the appropriate perfluoroalkane sulfonylhalide. This overall reaction is summarized, using the more readily available sulfonyl chloride, as follows:

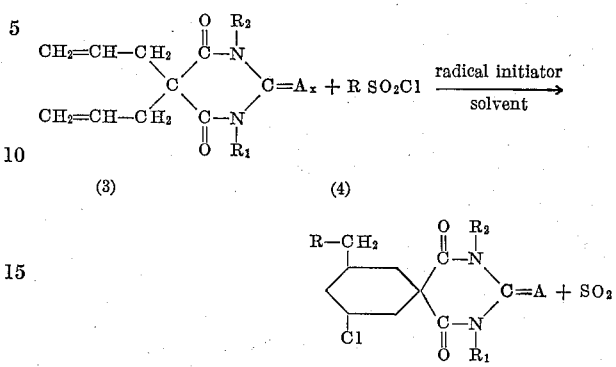

where $R_1$ and $R_2$ are hydrogen or lower alkyl, and $R_x$ and A have their above defined meanings.

The compounds of the invention in which $R_x$ is a perhalomethyl group and those wherein $R_x$ is perfluoroalkyl and $X_4$ is iodine are readily prepared by contacting diallylbarbituric acid, an N-lower alkyl substituted diallylbarbituric acid, or an N,N'-di-lower alkyl substituted diallylbarbituric acid with a perhalomethyl halide or perfluoroalkyl iodide, respectively, in the presence of a radical initiator all contained in a solvent or diluent.

The overall reaction is summarized as follows:

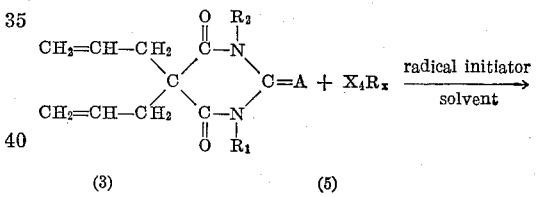

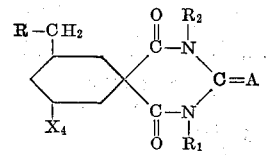

where $R_1$ and $R_2$ are hydrogen or lower alkyl, $R_x$ is a perhalomethyl or perfluoroalkyl group, A and $X_4$ have their previously defined meanings and $X_4$ is iodine when $R_x$ is perfluoroalkyl.

The perhalomethyl group and $X_4$ halogens are more particularly defined when the perhalomethyl group is designated

as follows:

$X_1$, $X_2$ and $X_3$ are selected from the group consisting of fluorine, chlorine, bromine and iodine selected so that the sum of the atomic numbers is less than 125 and $X_4$ is selected from the group consisting of chlorine, bromine and iodine to have an atomic number at least as great as the highest atomic number of each of $X_1$, $X_2$ and $X_3$, the sum of atomic numbers of $X_1$, $X_2$, $X_3$ and $X_4$ being at least 65. That is, when $X_1$, $X_2$ and $X_3$ are each fluorine, then $X_4$ is iodine, when $X_1$, $X_2$ and $X_3$ are each chlorine, then $X_4$ is selected from the group consisting of chlorine, bromine, and iodine, when $X_1$, $X_2$ and $X_3$ are each bromine, then $X_4$ is selected from the group of bromine and iodine, when $X_1$ and $X_2$ are each fluorine and $X_3$ is chlorine, then $X_4$ is selected from the group consisting of bromine, chlorine and iodine, when $X_1$ and $X_2$ are each fluorine and $X_3$ is bromine, then $X_4$ is selected from the group consisting of bromine and iodine, when $X_1$ and $X_2$ are each fluorine and $X_3$ is iodine, then $X_4$ is iodine, when $X_1$ is fluorine and $X_2$ and $X_3$ are each chlorine, then $X_4$ is selected from the group consisting of bromine, chlorine and iodine, when $X_1$ is fluorine and $X_2$ and $X_3$ are each bromine, then $X_4$ is selected from the group consisting of bromine and iodine, when $X_1$ and $X_2$ are each chlorine and $X_3$ is bromine, then $X_4$ is selected from the group consisting of bromine and iodine, when $X_1$ and $X_2$ are each chlorine and $X_3$ is iodine, then $X_4$ is iodine, when $X_1$ is chlorine and $X_2$ and $X_3$ are each bromine, then $X_4$ is selected from the group consisting of bromine and iodine, when $X_1$ is chlorine, $X_2$ is bromine and $X_3$ is iodine then $X_4$ is iodine, and when $X_1$ is chlorine, and $X_2$ and $X_3$ are each iodine, then $X_4$ is iodine.

The term "free-radical initiator" or just "radical initiator" in this application is used in reference to materials capable of causing homolytic cleavage as by thermal activation of the compounds of Formula 4 above. Any suitable radical initiator known to the art can be used to initiate the reaction. As those skilled in the art will readily appreciate, radical initiators which are degraded or otherwise inactivated by compounds of Formulae 4 and/or 5 obviously will not produce the desired reaction. Suitable radical initiators include, for example, such materials as lauroyl peroxide, benzoylperoxide, azobisisobutyronitrile, ditertiarylbutyl peroxide, dicumyl peroxide, actinic radiation such as ultraviolet light and the like.

In general, the reaction is carried out in an inert liquid diluent or solvent. The word "solvent" as used in this application is equivalent to the word "diluent" and does not necessarily indicate a true solution. The use of a solvent in the processes of this invention is incidental and not critical but offers the advantage of controlling reactions in which there is considerable exotherm. Generally a liquid which is inert over the range of reaction conditions involved is employed. For reasons of availability, inert liquid hydrocarbons are preferred, such as benzene, hexane, pentane, heptane, toluene, and the like.

It is preferred to employ an amount of solvent at least sufficient to facilitate mixing of reactants. Thus, it is preferred to use an amount of solvent at least equal in weight to the combined weight of the reactants employed in any given reaction and up to about ten times the combined weight of the reactants employed although the amount of solvent actually employed for a given reaction is not critical.

Concerning the quantity of the reactants employed, e.g. ratio of compounds of Formula 3 to compounds of Formula 4 or 5, one can employ a molar excess of either class of starting material. Thus, one can employ a 20:1 molar ratio, or even greater, of one reactant to the other. However, from the standpoint of efficiency, approximate molar ratios from 1:1 to 2:1 (i.e. slightly in excess of stoichiometric proportions) are preferred.

In general, the amount of chemical radical initiator employed for a given reaction can vary between wide limits. Usually one employs at least about 0.001% to 1% and up to about 3% of radical initiator based on the combined weight of reactants. The optimum amount of radical initiator to be employed in any given reaction will of course vary from reaction to reaction, and it is not possible to give the exact amount for every given combination of reaction conditions and reactants. When ultraviolet light is used as the radical initiator, the illumination is sufficient to induce compounds of Formula 4 or 5 to react with those of Formula 3.

The reaction is conducted at temperatures from about 20° C. up to the reflux temperature of the particular diluent or solvent employed. It is generally preferred to employ temperatures at or near reflux, but, as those skilled in the art will appreciate, the optimum reaction temperature for any specific reaction is that which will produce the greatest extent of reaction between the compounds. Reaction times are generally under 24 hours.

The starting materials of Formula 3 are well known to the art. Diallylbarbituric acid itself is commercially available and can be used to prepare the N-lower alkyl substituted derivatives by conventional alkylation procedures. N-alkyl or N,N'-dialkyl derivatives of 5,5-diallylbarbituric acid can be made from the corresponding urea or thiourea derivatives and diallylmalonic ester. N-alkenyl derivatives are made from the cyclized (spiro) product of Formula 2. The presence of an alkenyl group on one or more of the nitrogen atoms of 5,5-diallylbarbituric acid starting material of Formula 3 tends to cause undesirable side reactions.

A preferred method of preparing compounds of Formula 1 wherein $R_1$ and/or $R_2$ is lower alkenyl consists of contacting the corresponding sodium salt of the appropriate Formula 1 compound with the lower alkenyl halide (where the halide is chloride, iodide or preferably bromide) e.g. allyl bromide. The yields of N-alkenyl-substituted thiobarbituric acids (compounds of Formula 1 in which A is S) may be rather low as a result of side reactions which may occur in this alkylation reaction.

The perfluoroalkane sulfonyl chlorides of Formula 4 are made by treating $R_fSO_2F$ with 95% hydrazine followed by chlorine according to the method described in United States Patent No. 2,950,317 to Harvey A. Brown and Ralph I. Coon.

The salts of Formula 2 are readily prepared from the appropriate free acidic compounds of Formula 1 by reaction with the inorganic base containing the desired cation in an aqueous or alcoholic medium.

Products of this invention prepared by the routes described above are comprised of mixtures of optically active isomers, e.g. due to asymmetry about the common spiro carbon atom. Those skilled in the art will appreciate that the broad melting ranges of the products of this invention are the result of the formation of the compound as two or more racemic mixtures. The salts formed with optically active bases for example, with alkaloids, may be used for the resolution of the racemic mixtures of the invention.

The compounds of this invention have a number of utlities. They are physiologically active. In Formulas 1 and 2, when $R_1$ is hydrogen, and $R_2$ is hydrogen or lower alkyl (other substituents remaining the same as defined), the compounds display hypnotic activity. When $R_1$ and $R_2$ in Formulas 1 and 2 are both alkyl (other substituents remaining the same as defined), the compounds are convulsants.

The compounds of Formula 2 have use as buffering agents, as, for example, where a specific pH must be maintained in an in vitro physiological test procedure. They are effective in the range of from about pH 7 to 9.

The salts of Formula 2 are particularly useful because of their water solubility especially in those situations where one desires aqueous solutions of the relatively insoluble compounds of Formula 1. For example, compounds of Formula 2 are useful for immobilizing aquatic animals, such as fish. These compounds appear to exert tranquilizing effects on such animals. One can simply introduce a compound of Formula 2 into the aqueous environment of the animal(s) to be immobilized.

The compounds of this invention display plant growth regulant activity and have some fungicidal action.

The invention is further illustrated by reference to the following examples:

EXAMPLE 1

Perfluorooctansulfonyl chloride, 56.9 g. (0.11 moles), 20.8 g. of 5,5-diallylbarbituric acid (0.1 moles) and 250 ml. of dry benzene were charged to a 500 ml. Vycor flask. The reactants are heated to reflux over a Hanovia UV lamp and refluxed until $SO_2$ ceases to be given off. The reaction mixture is filtered and the filtrate is concentrated and refiltered. 37 grams of crude spiro-[3'-($\alpha,\alpha$-dihydroperfluorononyl)-5'-chlorocyclohexane - 1',5 - (barbituric acid)] are obtained which are crystallized 3 times from ethanol, washed with ether and air dried. The light yellow product has a melting point 208–209° C.

Calculated for $C_{18}H_{12}F_{17}N_2O_3Cl$: 32.3%, 4.23% N. Found: 32.8% C., 4.41% N.

Salts of the above spiro-[3'-($\alpha,\alpha$-dihydroperfluorononyl)-5'-chloro-cylohexane-1',5-(barbituric acid)] are prepared by adding a solution of 0.1 mole of sodium hydroxide in 50 ml. of ethanol to a solution of 0.1 mole of the free acid in 100 ml. of absolute ethanol. The mixture is filtered and the filtrate is evaporated to dryness. The residual sodium spiro-[3'-($\alpha,\alpha$-dihydroperfluorononyl)-5'-chloro-cyclohexane-1',5-(barbituric acid)] is dried under vacuum at about 50° C. for several hours.

The same procedure is followed using corresponding stoichiometric equivalents of potassium hydroxide, calcium hydroxide, magnesium hydroxide and ammonium hydroxide to prepare respectively the potassium, calcium, magnesium and ammonium salts of spiro [3'-($\alpha,\alpha$-dihydroperfluorononyl)-5'-chloro-cyclohexane-1',5-(barbituric acid)].

When an ethanol solution containing stoichiometric amounts of tetramethylammonium hydroxide and the same free acid is evaporated to dryness, there is obtained the tetramethylammonium salt of spiro[3'-($\alpha,\alpha$-dihydroperfluorononyl)-5'-chlorocyclohexane - 1',5 - (barbituric acid)].

When a solution of about 0.01 mole of brucine in ethanol is mixed with a solution of 0.01 mole of the same free acid, the brucine salt is precipitated.

N-alkenyl- substituted derivatives of the compounds of Formula 1 where $R_1$ and/or $R_2$ is a lower alkenyl group are prepared by treating the corresponding sodium salts, prepared as described in Example II, in the presence of a diluent such as benzene with a stoichiometric amount of the desired lower alkenyl bromide and then heating the mixture over a steam bath until the calculated amount of NaBr is obtained. The reaction mixture is filtered and the diluent removed at reduced pressure. The product is crystallized from benzene or other appropriate solvent. Thus, the compound spiro[3'-($\alpha,\alpha$-dihydroperfluoropentyl)-5'-chloro-cyclohexane - 1',5 - (1-allylbarbituric acid)] is prepared by heating 1 mole of allyl bromide with 1 mole of spiro[3'-($\alpha,\alpha$-dihydroperfluoropentyl)-5'-chloro-cyclohexane - 1',5 - (barbituric acid)] sodium salt.

EXAMPLE 2

The procedure of Example 1 is repeated employing 0.11 mole of perfluorooctanesulfonyl bromide. The yellowish product is spiro-[3'-($\alpha,\alpha$-dihydroperfluorononyl)-5'-bromocyclohexane-1',5-(barbituric acid)].

The following examples presented in tabular form as Table I shows the preparation of additional compounds of Formula 1 in which $R_x$ is perfluoroalkyl. A ten mole percent excess over stoichiometric of the perfluoroalkanesulfonyl chloride is employed. The solvent is benzene. The amount of benzoyl peroxide employed in Examples 7 and 8 is about 1% based on combined weight of reactants. Ultra-violet light is the initiator in the other examples. Reaction time is about 24 hours and the temperature is maintained at or near reflux, in each instance.

Table I

| Ex. No. | A | $R_1$ | $R_2$ | $R_3$ | Product |
|---|---|---|---|---|---|
| 3 | O | $CH_3$ | H | $C_8F_{17}$ | $C_8F_{17}CH_2$, Cl, $CON-CH_3$, $C=O$, $CONH$ |
| 4 | O | H | H | $CF_3$ | $CF_3CH_2$, Cl, $CONH$, $C=O$, $CONH$ |
| 5 | O | $C_3H_5$ [a] | H | $C_4F_7$ | $C_4F_7CH_2$, Cl, $CON-C_3H_5$, $C=O$, $CONH$ |
| 6 | S | $C_6H_{13}$ | $C_6H_{13}$ | $C_{12}F_{25}$ | $C_{12}F_{25}CH_2$, Cl, $CON-C_6H_{13}$, $C=S$, $CON-C_6H_{13}$ |
| 7 | S | H | H | $C_8F_{17}$ | $C_8F_{17}CH_2$, Cl, $CONH$, $C=S$, $CONH$ |
| 8 | S | $CH_3$ | $CH_3$ | $CF_3$ | $CF_3CH_2$, Cl, $CON-CH_3$, $C=S$, $CON-CH_3$ |

[a] Allyl group; introduced by subsequent reaction as described above.

EXAMPLE 9

Bromotrichloromethane, 5.91 grams (0.03 moles), 5.2 grams (0.025 moles) of 5,5-diallylbarbituric acid and 150 ml. of benzene are heated to reflux in a 250 ml. pyrex flask with a condenser attached. After the mixture has refluxed 15 minutes, 0.1 g. of benzoylperoxide is added. Refluxing is continued 16 hours after which 0.1 g. of additional benzoylperoxide is added. After four more hours of refluxing, the reaction mixture is cooled to room temperature. The resulting precipitate of spiro[3'-($\beta,\beta,\beta$-trichloroethyl)-5'-bromo - cyclohexane - 1',5-(barbituric acid)] is filtered off and crystallized from benzene (73 percent yield). Melting point 85–86° C.

Calculated for $C_{11}H_{12}N_2O_3BrCl_3$: 33.3% C, 3.0% H, 6.9% N; 9.85% meq./g. total halogen. Found: 33.8% C, 3.3% H, 6.9% N; 9.7 meq./g. total halogen.

EXAMPLE 10

A mixture of 20.8 g. (0.1 mole) of diallylbarbituric acid in 150 ml. of benzene is heated to boiling for 10 minutes and flushed with nitrogen. Carbontetrabromide, 36.5 g. (0.11 mole), is added and the mixture is boiled another 10 minutes. Benzoylperoxide, 0.5 g., is added as a benzene solution. The mixture is refluxed 16 hours. The clear, colored solution is stripped of solvent at reduced pressure over steam. The residue, 53 g., is taken up in 100 ml. of ethanol, concentrated, cooled and filtered. The filter cake is then crystallized from ethanol and carbontetrachloride successively. Spiro[3'-($\beta,\beta,\beta$ - tribromoethyl)-5'-bromo-cyclohexane-1',5-(barbituric acid)] melts at 105–110° C. with decomposition.

Calculated for $C_{11}H_{12}N_2O_3Br_4$: 24.5% C, 2.22% H, 59.2% Br. Found: 27.1% C, 3.2% H, 57.2% Br.

EXAMPLE 11

Dibromodichloromethane 72.6 g. (0.3 mole), 41.6 g. (0.2 mole) of 5,5-diallyl barbituric acid and 250 ml. of benzene is heated to reflux in a 500 ml. quartz flask over a Hanovia U.V. lamp. After 20 hours of refluxing, only a small amount of insoluble material remains. The liquor is decanted, concentrated to ⅓ volume and filtered. The filtrate is evaporated and the residue crystallized twice from ethanol, giving 9 g. of colorless spiro[3'-($\beta$-bromo-$\beta,\beta$-dichloroethyl)-5'-bromocyclohexane-1',5-(barbituric acid)] melting point 101–105° with decomposition.

Calculated for $C_{11}H_{12}N_2O_3Br_2Cl_2$: 8.89 meq./g. total halogen. Found: 7.98 meq./g. total halogen.

EXAMPLE 12

Fluorotribromoethane, 15 g., 10.4 g. of 5,5-diallyl-barbituric acid, 100 ml. of dry benzene and 0.5 g. of benzoyl peroxide is heated to reflux while flushing the system with nitrogen. After 16 hours a clear solution is obtained which is cooled to room temperature and filtered. The filtrate is stripped of solvent and the residue is crystallized from 95 percent ethanol giving 13 g. of spiro[3' - ($\beta$ - fluoro - $\beta,\beta$ - dibromoethyl)-5'-bromocyclohexane-1',5-(barbituric acid)] melting at 189–196° C. with decomposition.

Calculated for $C_{11}H_{12}N_2O_3Br_3F$: 6.12 meq./g. total halogen. Found: 5.91 meq./g. total halogen.

EXAMPLE 13

2-thio-5,5-diallylbarbituric acid, 9.5 g. (0.042 mole), 10.0 g. (0.05 mole) of trichloromethyl bromide, 0.5 g. of azobisisobutyronitrile and 250 ml. of benzene is reacted and worked according to the procedure described in Example 9 to give light yellow, solid spiro[3'-$\beta,\beta,\beta$-trichloroethyl)-5'-bromo-cyclohexane-1',5-(2-thiobarbituric acid)] melting at 180–185° C. with decomposition.

Calculated for $C_{11}H_{12}N_2O_2SBrCl_3$: 33.7% C, 2.8% H, 9.52 meq./g. total halogen. Found: 32.5% C, 3.0% H, 9.71 meq./g. total halogen.

EXAMPLE 14

An aqueous solution of 41.6 g. (0.2 mole) of 5,5-diallylbarbituric acid and 8.0 g. of NaOH is treated with 25.2 g. (0.2 mole) dimethyl sulfate while shaking and cooling over a period of 1.5 hours. The mixture is acidified with concentrated HCl and the precipitate is filtered off. The colorless solid is taken up in normal aqueous NaOH, extracted with ether and acidified with HCl followed by crystallization of the resulting N-methyl diallyl barbituric acid from CCl₄.

1-methyl-5,5-diallyl barbituric acid, 9.0 g. (0.04 mole), and 250 ml. of dry benzene are heated to boiling in a 500 ml. flask. About 30 ml. of benzene is distilled off and then 9.85 g. (0.05 mole) of CCl₃Br and 0.5 g. of azobisisobutyronitrile are added. A condenser is attached and the reactants are refluxed. After 20 hours, an additional 0.5 g. of azobisisobutyronitrile is added and refluxing is continued four more hours. The solvent is stripped off at reduced pressure and the residual spiro[3'-($\beta,\beta,\beta$ - trichloroethyl) - 5' - bromo-cyclohexane-1',5-(1-methylbarbituric acid)] is crystallized twice from EtOH. The product melted 95–98° C. (decomposition).

Calculated for $C_{12}H_{14}N_2O_3BrCl_3$: 34.8% C, 3.34% H, 9.2 meq./g. total halogen. Found: 34.9% C, 3.9% H, 8.7 meq./g. total halogen.

EXAMPLE 15

An aqueous solution of 41.6 g. (0.2 mole) of 5,5-diallylbarbituric acid and 17.6 g. of NaOH is treated with 51.6 g. (0.41 mole) of dimethyl sulfate while shaking and cooling in ice over a period of 1 hour. The resulting precipitate is filtered off and washed with several portions of water. After crystallization from CCl₄ the N,N'-dimethyl-diallyl barbituric acid melted at 51–53° C.

1.3-dimethyl-5,5-diallylbarbituric acid, 11.9 (0.05 moles), and 250 ml. of benzene are placed in a 500 ml. flask. About 50 ml. of benzene is boiled off and then 19.7 (0.1 mole) of CCl₃Br and 0.5 g. of azobisisobutyronitrile are added and a condenser attached to the flask. The reaction mixture is refluxed 20 hours and then 0.5 g. of azobisisobutyronitrile is added and the mixture is refluxed four more hours. The solvent and excess CCl₃Br is removed at reduced pressure leaving a glassy residue of spiro[3' - ($\beta,\beta,\beta$ - trichloroethyl) - 5'-bromo-cyclohexane-1',5-(1,3-dimethyl barbituric acid)].

Calculated for $C_{13}H_{16}N_2O_3BrCl_3$: 36.0% C, 3.7% H, 9.2 meq./g. total halogen. Found 36.6% C, 4.0% H, 8.7 meq./g. total halogen.

To a solution of 0.1 mole of the above free acid in 100 ml. of absolute ethanol is added a solution of 0.1 mole of sodium hydroxide in 50 ml. of ethanol. The mixture is filtered and the filtrate is evaporated to dryness. The residue which consists of sodium-spiro[3'-($\beta,\beta,\beta$-trichloroethyl)-5'-bromo-cyclohexane-1'5-(barbituric acid)] is dried under vacuum at about 50° C. for several hours.

The same procedure is followed using corresponding stoichiometric equivalents of potassium hydroxide and ammonium hydroxide and also suspensions of calcium hydroxide and magnesium hydroxide to prepare respectively, the K, ammonium, Ca and Mg salts of spiro[3'-($\beta,\beta,\beta$ - trichloroethyl) - 5'-bromo-cyclohexane-1',5-(barbituric acid)].

When a solution of about 0.01 moles of brucine in ethanol is mixed with a solution of 0.01 moles of the same free acid, the brucine salt is precipitated.

An ethanol solution containing stoichiometric amounts of tetramethyl ammonium hydroxide and the same free acid is evaporated to dryness, there is obtained the tetramethyl ammonium salt of spiro[3'($\beta,\beta,\beta$-trichloroethyl)-5'-bromo-cyclohexane-1',5-(barbituric acid)].

N-alkenyl-substituted derivatives of the compounds of Formula 1 where $R_1$ and/or $R_2$ is a lower alkenyl group are prepared by treating the corresponding sodium salt, prepared as described above, with a stoichiometric amount of the desired lower alkenyl bromide in the presence of a diluent such as benzene and then heating the mixture on a steam bath until the calculated amount of sodium bromide is obtained. The reaction mixture is filtered and the diluent removed at reduced pressure. The product is crystallized from benzene or other appropiate solvent. Thus, the compound spiro[3'($\beta,\beta,\beta$-trichloroethyl) - 5' - bromo - cyclohexane - 1',5 - (1-allyl barbituric acid)] is prepared by this procedure from the above sodium salt.

The following examples presented in tubular form as Table II show the preparation of additional compounds of the invention. A ten mole precent excess of the compounds of Formula 5 to the compounds of Formula 3 is employed. The solvent is benzene in an amount equal to twice the combined weight of reactants, and the amount of benzoyl perxodie employed in each example as the radical initiator is about 1% of the combined weight of reactants. Reaction time is about 24 hours and the temperature is maintained at or near reflux, in each instance.

Table II

| Example No. | Formula 3 Compounds | | | Formula 5 Compounds | | | | Product (all colorless solids) |
|---|---|---|---|---|---|---|---|---|
| | $R_1$ | $R_2$ | A | $X_1$ | $X_2$ | $X_3$ | $X_4$ | |
| 16 | H | H | O | Cl | Cl | Cl | Cl | $CCl_3CH_2$-cyclohexane with Cl, CONH-CO-CONH ring |
| 17 | H | H | O | Cl | F | F | Br | $CClF_2CH_2$-cyclohexane with Br, CONH-CO-CONH ring |
| 18 | H | H | O | Br | F | F | Br | $CBrF_2CH_2$-cyclohexane with Br, CONH-CO-CONH ring |
| 19 | H | H | O | F | F | F | I | $CF_3CH_2$-cyclohexane with I, CONH-CO-CONH ring |
| 20 | H | $C_3H_5$ [a] | O | Cl | Cl | Cl | Br | $CCl_3CH_2$-cyclohexane with Br, CONH-CO-CON-$CH_2CH=CH_2$ ring |
| 21 | H | $C_6H_{13}$ | O | Cl | Cl | Cl | Br | $CCl_3CH_2$-cyclohexane with Br, CONH-CO-CON-$C_6H_{13}$ ring |
| 22 | H | H | S | Cl | Cl | Br | Br | $CCl_2BrCH_2$-cyclohexane with Br, CONH-CS-CONH ring |
| 23 | $C_3H_5$ [a] | $C_3H_5$ [a] | O | Cl | Cl | Cl | Br | $CCl_3CH_2$-cyclohexane with Br, CON-$CH_2$-$CH=CH_2$-CO-CON-$CH_2$-$CH=CH_2$ ring |
| 24 | H | H | O | F | F | I | I | $CF_2ICH_2$-cyclohexane with I, CONH-C=O-CONH ring |
| 25 | H | H | O | F | Cl | Cl | Cl | $CFCl_2CH_2$-cyclohexane with Cl, CONH-C=O-CONH ring |
| 26 | H | H | S | Cl | Br | Br | I | $CClBr_2CH_2$-cyclohexane with I, CONH-C=S-CONH ring |
| 27 | H | $CH_3$ | O | Cl | Cl | I | I | $CCl_2ICH_3$-cyclohexane with I, $CONCH_3$-C=O-CONH ring |
| 28 | H | $C_4H_9$ | O | Cl | I | I | I | $CClI_2$-$CH_2$-cyclohexane with I, $CONC_4H_9$-C=O-CONH ring |

Footnote at end of table.

Table II—Continued

| Example No. | Formula 3 Compounds | | | Formula 5 Compounds | | | | Product (all colorless solids) |
|---|---|---|---|---|---|---|---|---|
| | $R_1$ | $R_2$ | A | $X_1$ | $X_2$ | $X_3$ | $X_4$ | |
| 29 | H | H | O | Cl | Br | I | I | 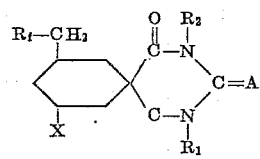 | a Allyl groups are attached after cyclization.

EXAMPLE 30

A mixture of 0.1 mole of diallylbarbituric acid and 0.11 mole of perfluorooctyl iodide in 100 ml. of xylene hexafluoride is refluxed in a Vycor flask in the illumination of an ultraviolet light as described above for 24 hours. The reaction mixture is evaporated and the residue recrystallized to give spiro-[3'-($\alpha,\alpha$-dihydroperfluorononyl)-5'-iodocyclohexane-1',5-(barbituric acid)] as a slightly yellowish solid.

What is claimed is:
1. A member selected from the group consisting of
   I. A compound of the formula

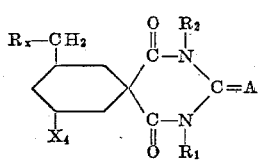

wherein $R_x$ is a perhaloalkyl radical selected from the group consisting of perfluoroalkyl having 1 to 12 carbon atoms, trichloromethyl, tribromomethyl, chlorodifluoromethyl, bromodifluoromethyl, iododifluoromethyl, fluorodichloromethyl, fluorodibromomethyl, chlorodibromomethyl, bromodichloromethyl, iododichloromethyl, chlorodiodomethyl and chlorobromoiodomethyl;

$X_4$ is halogen of the group consisting of chlorine, bromine and iodine selected to have an atomic number at least as great as the atomic number of the halogen of $R_x$ with the highest atomic number;

$R_1$ and $R_2$ are selected from the group consisting of hydrogen, lower alkyl and lower alkenyl; and A is a member of the group consisting of oxygen and sulfur and II. A physiologically acceptable salt thereof with cation selected from the group consisting of alkali metals, ammonium and organic ammonium radicals.

2. A compound of the formula:

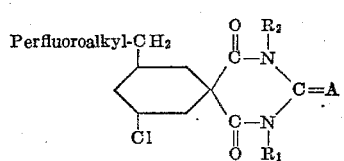

where $R_1$ and $R_2$ are selected from the group consisting of hydrogen, lower alkyl, and lower alkenyl, perfluoroalkyl contains from 1 to 12 carbon atoms, and A is selected from the group consisting of oxygen and sulfur.

3. Spiro[3'-($\beta,\beta,\beta$-trichloroethyl)-5'-bromo-cyclohexane-1',5-(barbituric acid)].

4. Spiro[3'-($\alpha,\alpha$-dihydroperfluorononyl)-5'-chlorocyclohexane-1',5-(barbituric acid)].

5. In a process for preparing a compound of the formula:

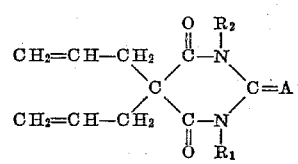

wherein X is halogen having atomic number from 15 to 37, $R_1$ and $R_2$ are selected from the group consisting of hydrogen and lower alkyl, $R_f$ is a perfluoroalkyl radical having from 1 to 12 carbon atoms and A is selected from the group consisting of oxygen and sulfur, the step of reacting, in the presence of a radical initiator in an inert hydrocarbon diluent, a compound of the formula:

where $R_1$, $R_2$ and A have the above significance, with a compound of the formula:

$$R_fSO_2X$$

where $R_f$ and X have the above significance.

6. In a process for preparing a compound of the formula:

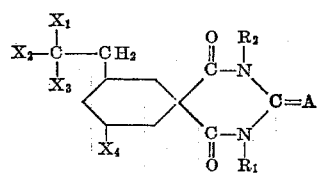

wherein $R_1$ and $R_2$ are selected from the group consisting of hydrogen and lower alkyl, A is selected from the group consisting of oxygen and sulfur, $X_1$, $X_2$ and $X_3$ are selected from the group consisting of fluorine, chlorine, bromine and iodine selected so that the sum of the atomic numbers is less than 125 and $X_4$ is selected from the group consisting of chlorine, bromine and iodine selected to have an atomic number at least as great as the highest atomic number of each of $X_1$, $X_2$ and $X_3$, the sum of the atomic numbers of $X_1$, $X_2$, $X_3$ and $X_4$ being at least 65, the step of reacting, in an inert diluent in the presence of a radical initiator, a compound of the formula.

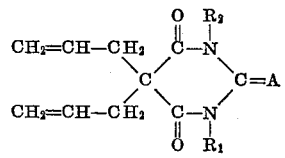

wherein $R_1$, $R_2$ and A have the above significance with a compound of the formula:

$$X_4CX_1X_2X_3$$

wherein $X_1$, $X_2$, $X_3$ and $X_4$ have the above significance.

No references cited.

HENRY R. JILES, *Acting Primary Examiner.*

JAMES W. ADAMS, *Assistant Examiner.*